United States Patent [19]
Honda et al.

[11] Patent Number: 4,727,955
[45] Date of Patent: Mar. 1, 1988

[54] CARBON CANISTER DRAINED VAPOR DIFFUSING DEVICE

[75] Inventors: Masazi Honda; Akio Chiba, both of Hatano; Hirotaka Tomioka, Kawasaki, all of Japan

[73] Assignee: Nissan Motor Company, Ltd., Japan

[21] Appl. No.: 941,220

[22] Filed: Dec. 12, 1986

[30] Foreign Application Priority Data

Dec. 28, 1985 [JP] Japan .......................... 60-203630[U]

[51] Int. Cl.$^4$ .............................................. B60K 13/04
[52] U.S. Cl. ...................................... 180/296; 55/387; 123/519
[58] Field of Search .................. 55/316, 387; 123/518, 123/519, 516; 180/225, 296; 280/5 A

[56] References Cited

U.S. PATENT DOCUMENTS 4,658,796 4/1987 Yoshida et al. ...................... 55/387

FOREIGN PATENT DOCUMENTS 55226 2/1979 Japan ................................. 123/520

*Primary Examiner*—Bernard Nozick
*Attorney, Agent, or Firm*—Lowe, Price, LeBlanc, Becker & Shur

[57] ABSTRACT

In a motor vehicle having in an engine room a carbon canister for adsorbing a vapor from a fuel tank, there is provided a vapor diffusing device which comprises a front side channel member extending in the engine room from a front portion of the vehicle toward a passenger room of the same, a structure incorporated with a part of the channel member to define an enclosed chamber, a first arrangement for fluidly connecting the interior of the enclosed chamber with a purge air opening of the carbon canister, and a second arrangement for defining a vapor diffusing opening through which the interior of the enclosed chamber is exposed to the interior of the engine room.

19 Claims, 15 Drawing Figures

CARBON CANISTER DRAINED VAPOR DIFFUSING DEVICE

BACKGROUND OF THE INVENTION

1. Field of the Invention

The present invention relates in general to emission control systems mounted in a motor vehicle, and more particularly to a vapor diffusing device which effectively diffuses, into the open air, the vapor which is inevitably drained from a carbon canister mounted in an engine room of the motor vehicle, when the engine stops.

2. Description of the Prior Art

Hitherto, carbon canisters have been widely used in motor vehicles for reasons of antipollution, which contain activated carbon and adsorb evaporated gases or vapor from a fuel tank thereby to prevent emission of the vapor into the open air. However, due to the inherent construction of the conventional carbon canisters, part of the vapor led into the canister is forced to discharge into the open air through a purge air inlet formed in the bottom of the canister, particularly at the time when the engine stops. In view of this phenomenon, some of the carbon canisters are equipped with a drain hose which extends from the bottom of the canister to a vapor diffusing device mounted in an engine room of the motor vehicle.

In order to clarify the task of the present invention, one conventional vapor diffusing device will be outlined with reference to FIG. 15.

Referring to the drawing, there is shown a conventional vapor diffusing device 100 fluidly connected with a carbon canister 10, which are mounted in an engine room E of a motor vehicle.

The carbon canister 10 is of a conventional one which comprises a cylindrical case 12 containing therein activated carbon and filters in a known manner. The carbon canister 10 shown in the drawing is mounted through a bracket 14 to a radiator core support 16 which constitutes a front panel member of the engine room E. Designated by numerals 18, 20 and 22 are respectively an evaporated gas tube from a fuel tank (not shown), a vacuum line from an intake manifold (not shown) and a purge air tube from the intake manifold. A drain hose 24 extends from a purge air inlet formed in the bottom of the canister 10 and leads to the vapor diffusing device 100.

The vapor diffusing device 100 comprises a front side channel member 26 and a hood ridge panel 28 which are assembled together to form an elongate space A therebetween. It is to be noted that the space A extends longitudinally from a front portion of the vehicle toward a passenger room of the same. Designated by numeral 24*a* is a connector used for connecting the leading end of the drain hose 24 to the channel member 26.

Vapors given off by the fuel in the fuel tank are led into the carbon canister where they are adsorbed. When the engine is restarted, fresh air is drawn through the activated carbon. The incoming fresh air purges or removes the vapors from the activated carbon and carries them into the intake manifold to be burned in the combustion chamber. As is described hereinabove, however, at the time when the engine stops, part of the vapors remaining in the canister is forced to discharge through the drain hose 24 into the space A of the vapor diffusing device 100. The vapors then flow in and along the space A, as shown by the arrow B, toward a longitudinal one perforated end of the device 100 where the vapors are diffused to the open air.

However, the disclosed conventional vapor diffusing device 100 is so constructed and arranged that the perforated end thereof is positioned near the passenger room of the vehicle. Accordingly, foul smelling vapors are often discharged into the passenger compartment.

SUMMARY OF THE INVENTION

It is therefore an object of the present invention to provide an improved vapor diffusing device which is constructed and arranged to be free of the above-mentioned drawback.

According to the present invention, there is provided, in a motor vehicle having in an engine room a carbon canister for adsorbing vapors from a fuel tank, an arrangement which comprises a front side channel member extending in the engine room from a front portion of the vehicle toward a passenger room of the same, a structure incorporated with a part of the channel member to define an enclosed chamber, first means fluidly connecting the interior of the enclosed chamber with a purge air opening of the carbon canister, and second means defining a vapor diffusing opening through which the interior of the enclosed chamber is exposed to the interior of the engine room, the vapor diffusing opening being positioned sufficiently apart from the passenger room.

DETAILED DESCRIPTION OF THE INVENTION

Figure 1:
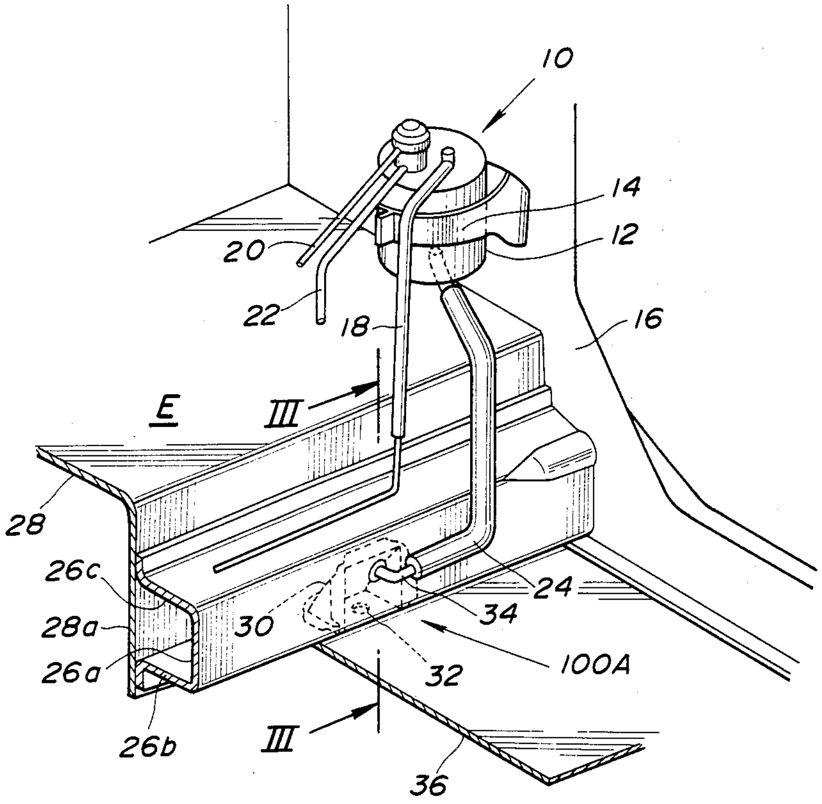
FIG. 1 is a partial view of an engine room in which a vapor diffusing device of a first embodiment of the present invention is arranged.
Figure 2:
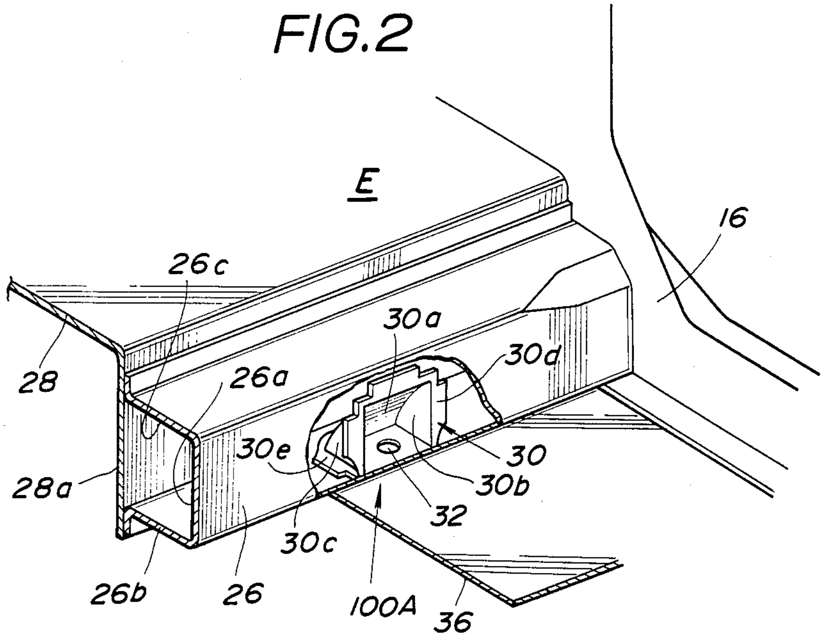
FIG. 2 is a view similar to FIG. 1, but showing the vapor diffusing device partially cut for clarifying the interior of the same.
Figure 3:
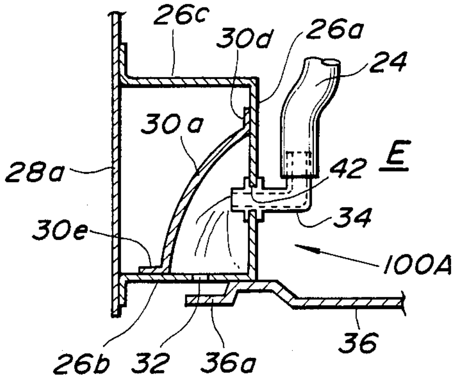
FIG. 3 is a sectional view taken along the line III—III of FIG. 1.

Referring to FIGS. 1 to 3, there is shown a vapor diffusing device 100A of a first embodiment of the present invention, which is fluidly connected with a conventional carbon canister 10 having the same construction and arrangement as the afore-mentioned one.

As is seen from FIG. 1, the canister 10 is mounted through a bracket 14 to a radiator core support 16 which constitutes a front panel member of the engine room E. An evaporated gas tube 18, a vacuum line 20 and a purge air tube 22 are connected to the canister 10 in the afore-mentioned manner. A drain hose 24 extends from the purge air inlet of the bottom of the canister 10 and leads to the vapor diffusing device 100A which has such a construction as will be described below.

The vapor diffusing device 100A of the first embodiment is incorporated with the front side channel member 26 which is welded at its flanges to a vertical wall portion **28*a* of the hood ridge panel 28**.

As is well understood from FIG. 2, the vapor diffusing device 100A comprises a depressed member 30 which is mounted in the channel member 26 to define a small enclosed chamber therein. That is, the depressed member 30 comprises a gently curved back wall **30*a* and two triangular side walls 30*b* and 30*c* extending perpendicularly from opposed edges of the back wall 30*a*. As is seen from the drawing, the back wall 30*a* and two side walls 30*b* and 30*c* are formed with both a common forward flange 30*d* and a common rear flange 30*e*. The depressed member 30 is fixed to the front side channel member 26 having the forward and rear flanges 30*d* and 30*e* thereof hermetically secured to the vertically arranged bottom wall 26*a* and the horizontally arranged lower side wall 26*b*, respectively. With this arrangement, a generally triangular prism-shaped enclosed chamber is defined by the depressed member 30 and the channel member 26. An opening 32 is formed in the lower side wall 26*b*, which is exposed to the engine room. As is seen from FIG. 3, an L-shaped connector 34 is fixed to the vertically arranged bottom wall 26*a* of the channel member 26, projecting into the chamber. The drain hose 24 extending from the carbon canister 10 is connected to the connector 34. Furthermore, as is seen from the same drawing, a front under cover 36 extending longitudinally from a front portion of the vehicle is secured or welded to the channel member 26. The cover 36 has a depressed side edge portion 36*a* which is spaced from the opening 32 of the channel member 26** to form a splashboard.

When the engine stops, part of the vapors remaining in the canister 10 are forced to flow through the drain hose 24 into the chamber of the vapor diffusing device 100A where the vapor is discharged into the open air through the opening 32. Since the vapor discharging opening 32 is positioned apart from the passenger cabin as compared with the above-mentioned conventional one, the ill-smell attack to the passenger is prevented or at least minimized. Furthermore, because of gas accumulating effect of the enclosed chamber of the vapor diffusing device 100A, the vapor led thereinto is discharged into the open air little by little, which weakens the ill-smell attack.

Figure 4:
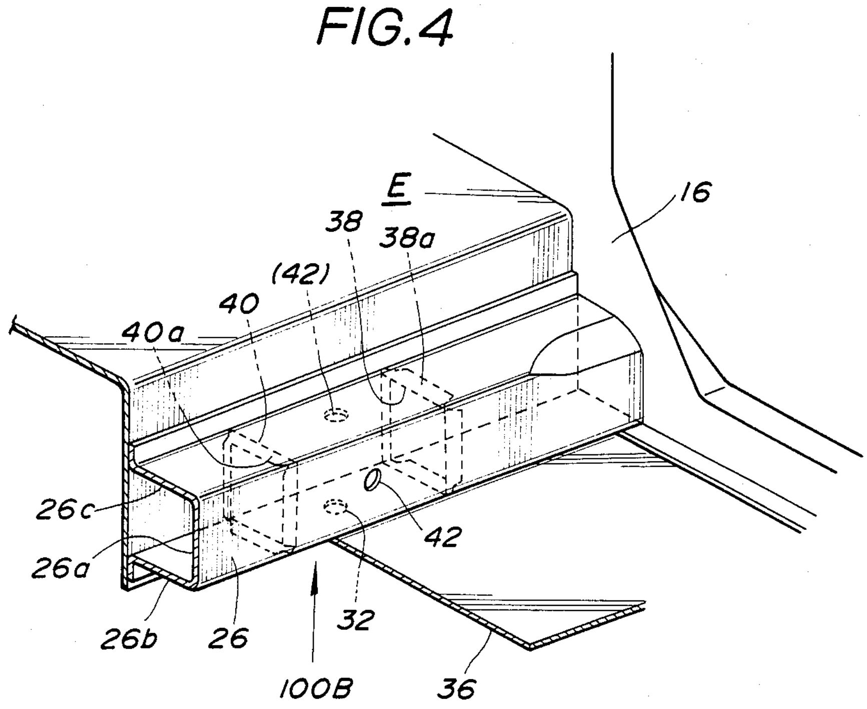
FIG. 4 is a view similar to FIG. 2, but showing a vapor diffusing device of a second embodiment of the present invention.

Referring to FIG. 4, there is shown a vapor diffusing device 100B of a second embodiment of the present invention. The vapor diffusing device 100B of this embodiment comprises a pair of partition members 38 and 40 each having a flange **38*a* or 40*a* at the periphery thereof. These two partition members 38 and 40 are spacedly disposed in the front side channel member 26 to provide therein a rectangular parallelpiped enclosed chamber. Similar to the afore-mentioned first embodiment, an opening 32 is formed in the lower side wall 26*b*, which is exposed to the engine room. A depressed side edge portion of the front under cover 36 is spaced from the opening 32 to form a splashboard. An opening 42 is formed in the vertically arranged bottom wall 26*a* at the portion to be exposed to the chamber. Although not shown in the drawing, an L-shaped connector (34, see FIG. 3) is fixed to the opening 42. If desired, such opening (42) may be formed in the horizontally arranged upper side wall 26*c* of the channel member 26**.

Of course, substantially the same advantageous function as that of the first embodiment is achieved by this second embodiment 100B.

Figure 5:
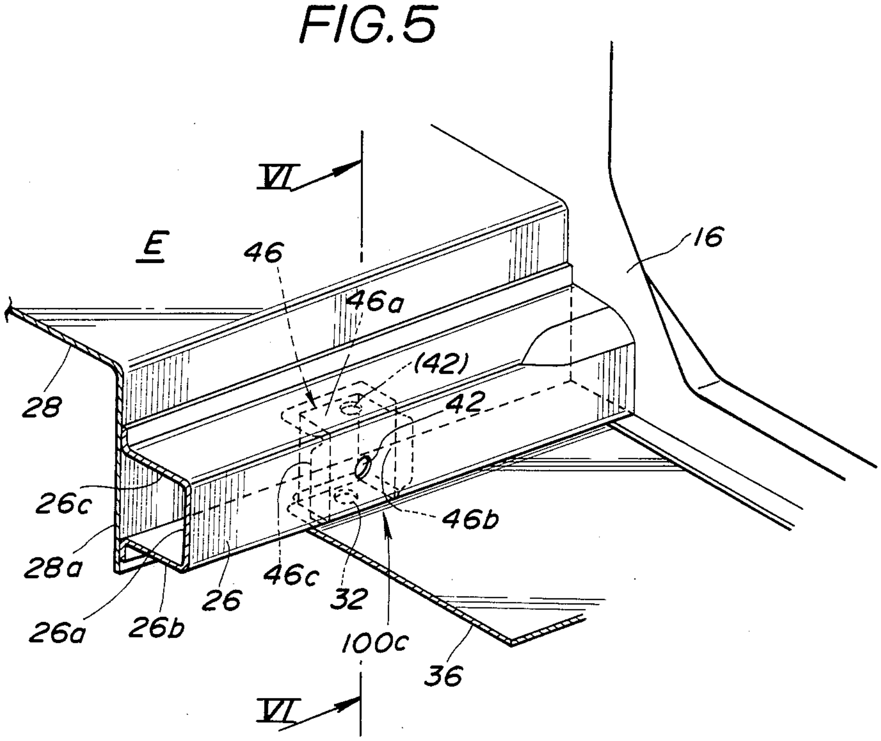
FIG. 5 is a view similar to FIG. 2, but showing a vapor diffusing device of a third embodiment of the present invention.
Figure 6:
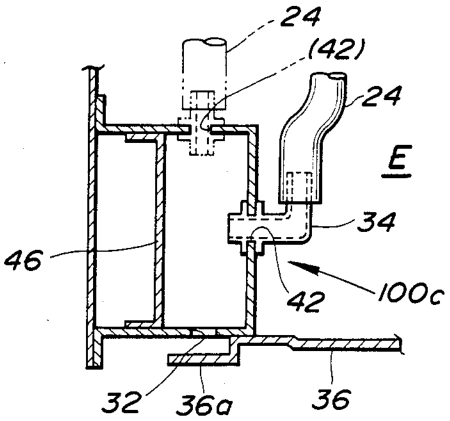
FIG. 6 is a sectional view taken along the line VI—VI of FIG. 5.

Referring to FIGS. 5 and 6, there is shown a third embodiment 100C of the present invention. In this embodiment, an angular arch-shaped member 46 is used for providing the vapor diffusing device 100C. As is seen from the drawings, the arch-shaped member 46 comprises a straight back wall **46*a* and two rectangular side walls 46*b* and 46*c* extending perpendicularly from opposed edges of the back wall 46*a*. The arch-shaped member 46 is formed at its peripheral edge with flanges (no numerals) therethroughout. The arch-shaped member 46 is fixed in the front side channel member 26 having the flanges thereof secured to the vertically arranged bottom wall 26*a* and the horizontally arranged upper and lower side walls 26*c* and 26*b*. With this arrangement, a rectangular parallelepiped enclosed chamber is defined by the arch-shaped member 46 and the channel member 26. An opening 32 is formed in the lower side wall 26*b* of the channel member 26, which is exposed to the engine room. A depressed side edge portion 36*a* of the front under cover 36 is spaced from the opening 32 to form a splashboard. An opening 42 is formed in the vertically arranged bottom wall 26*a*. An L-shaped connector (34, see FIG. 3) is fixed to the opening 42. If desired, such opening (42) may be formed in the horizontal upper side wall 26*c* of the channel member 26**.

Figure 7:
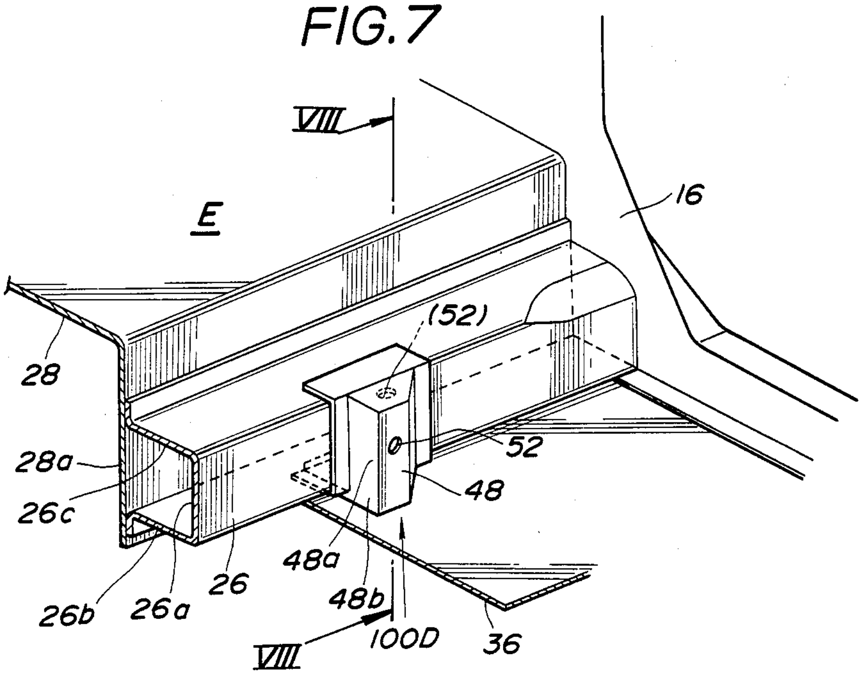
FIG. 7 is a view similar to FIG. 2, but showing a vapor diffusing device of a fourth embodiment of the present invention.
Figure 8:
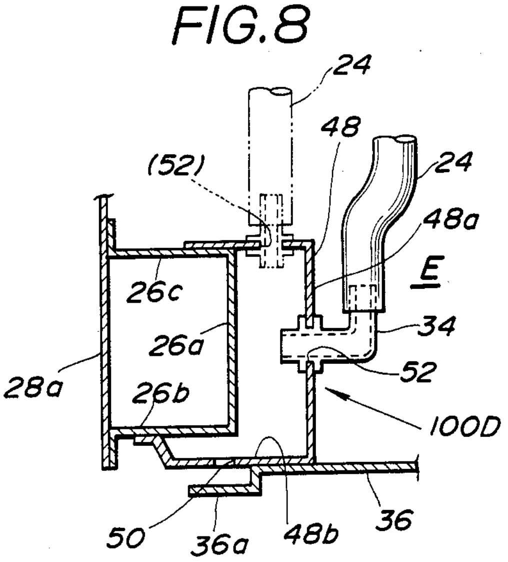
FIG. 8 is a sectional view taken along the line VIII—VIII of FIG. 7.

Referring to FIGS. 7 and 8, there is shown a fourth embodiment 100D of the present invention. In this embodiment, a depressed member 48 is mounted on the front side channel member 26 in a manner to define an enclosed chamber therebetween. As is seen from FIG. 8, the depressed chamber 48 comprises a major portion **48*a* disposed over the vertically arranged bottom wall 26*a* of the channel member 26 and a minor portion 48*b* disposed over the horizontally arranged lower side wall 26*b* of the channel member 26. An opening 50 is formed in a horizontally arranged lower side wall of the depressed member 48. Similar to the afore-mentioned embodiments, a depressed side edge portion 36*a* of the front under cover 36 is spaced from the opening 32 to form a splashboard. An opening 52 is formed in a top wall of the depressed member 48 for connecting with the L-shaped connector 34. If desired, such opening (52) may be formed in a horizontally arranged upper side wall of the depressed member 48**.

Figure 9:
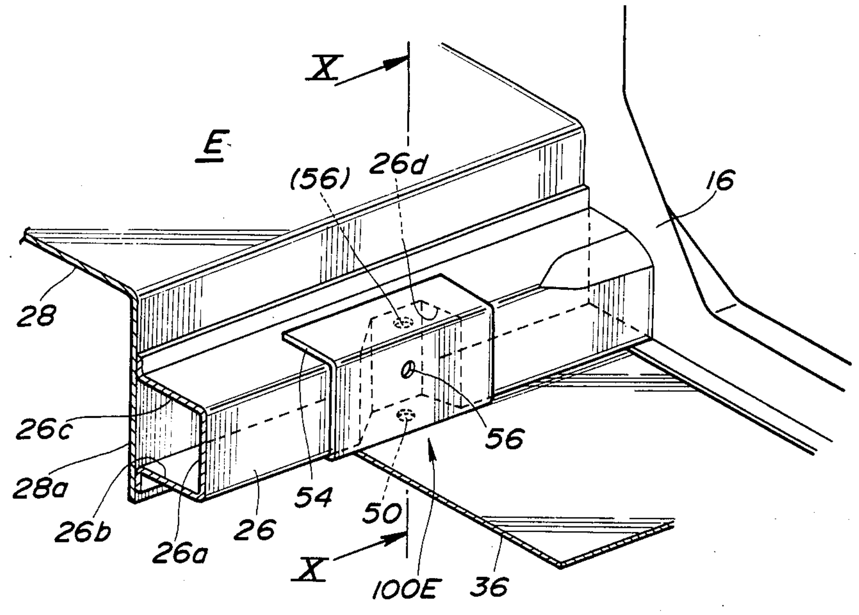
FIG. 9 is a view similar to FIG. 2, but showing a vapor diffusing device of a fifth embodiment of the present invention.
Figure 10:
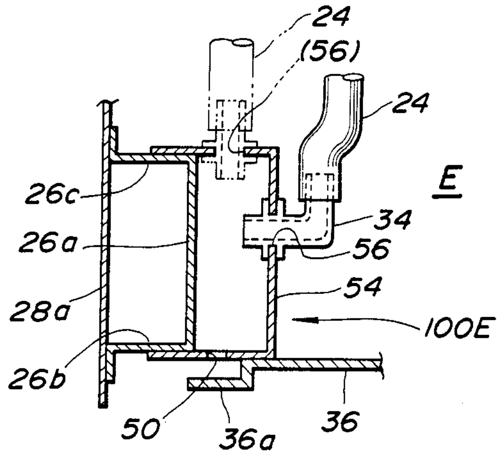
FIG. 10 is a sectional view taken along the line X—X of FIG. 9.

Referring to FIGS. 9 and 10, there is shown a fifth embodiment 100E of the present invention. In this embodiment, the front side channel member 26 is formed with a depressed portion 26d. A channel plate 54 is disposed on the front side channel member 26 to cover the depressed portion 26d. With this, an enclosed chamber is defined by the depressed portion 26d and the channel plate 54. An opening 50 is formed in a horizontally arranged lower side wall of the channel plate 54, which is exposed to the engine room. As is seen from FIG. 10, a depressed side edge portion 36a of the front under cover 36 is spaced from the opening 50 to form a splashboard. An opening 56 is formed in a vertically arranged bottom wall of the channel plate 54 for connecting with the L-shaped connector 34. If desired, such opening (56) may be formed in a horizontally arranged upper side wall of the channel plate 54.

Figure 11:
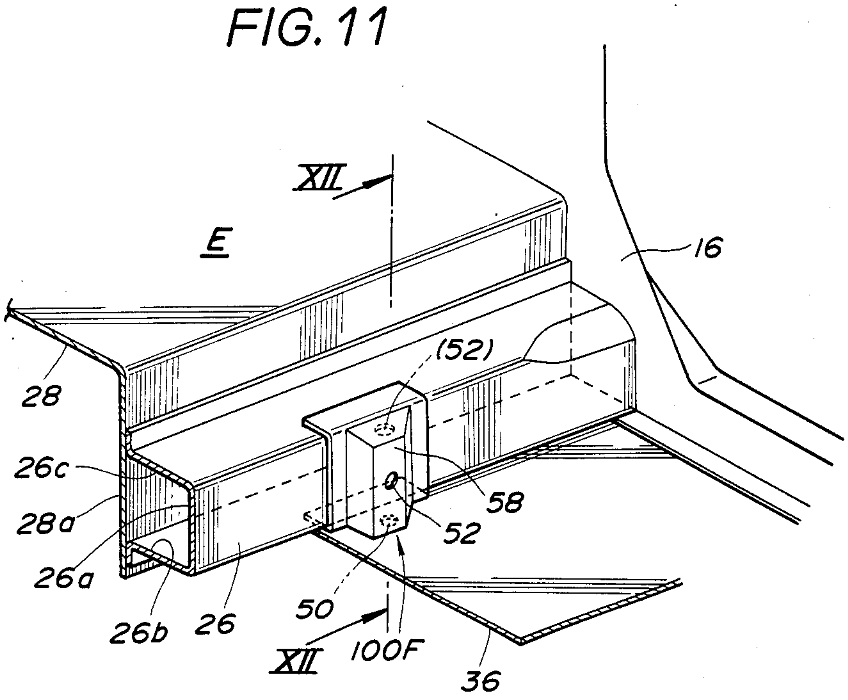
FIG. 11 is a view also similar to FIG. 2, but showing a vapor diffusing device of a sixth embodiment of the present invention.
Figure 12:
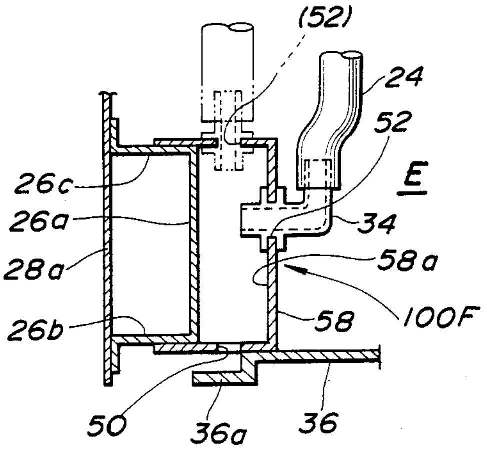
FIG. 12 is a sectional view taken along the line XII—XII of FIG. 11.

Referring to FIGS. 11 and 12, there is shown a sixth embodiment 100F which is similar to the afore-mentioned fourth embodiment 100D. That is, in the sixth embodiment, a depressed member 58 similar to the depressed member 48 of the fourth embodiment (see FIGS. 7 and 8) is used, which however has only a major portion 58a disposed over the vertically arranged bottom wall 26a of the front side channel member 26. An opening 50 is formed in a horizontally arranged lower side wall of the depressed member 58, and a depressed side edge portion 36a of the front under cover 36 is spaced from the opening 50 to form a splashboard. An opening 52 is formed in a top wall of the depressed member 58 for mounting the L-shaped connector 34 thereto. If desired, such opening (52) may be formed in a horizontally arranged upper side wall of the depressed member 58.

Figure 13:
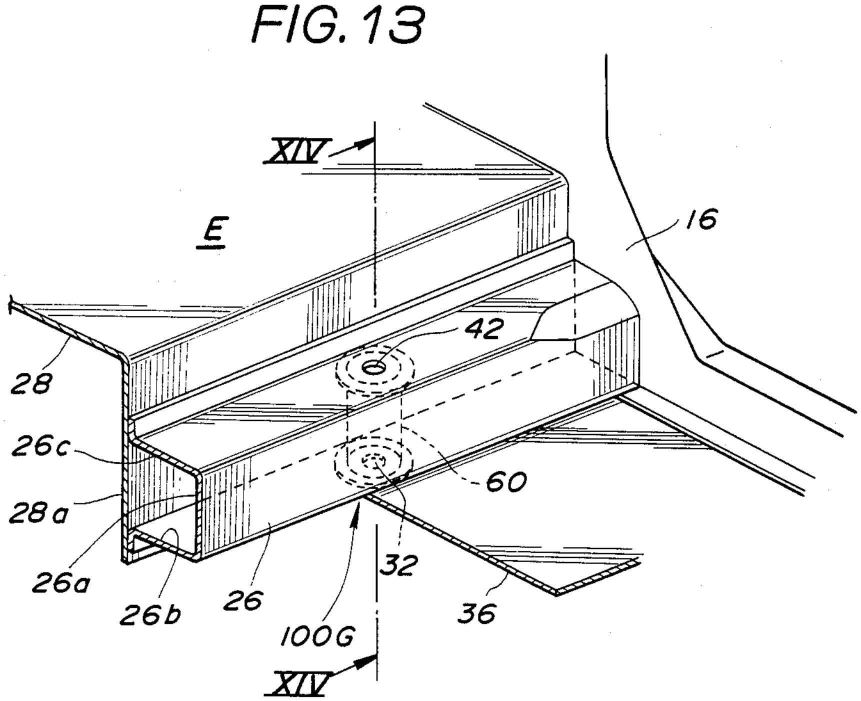
FIG. 13 is a view also similar to FIG. 2, but showing a vapor diffusing device of a seventh embodiment of the present invention.
Figure 14:
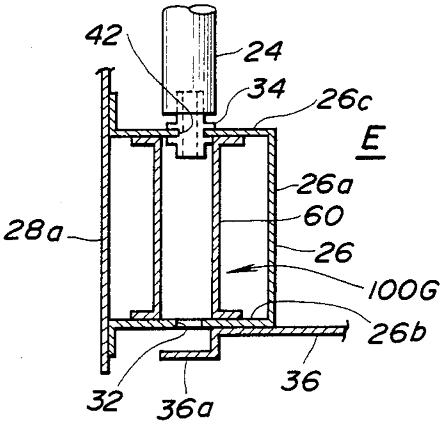
FIG. 14 is a sectional view taken along the line XIV—XIV of FIG. 13.
Figure 15:
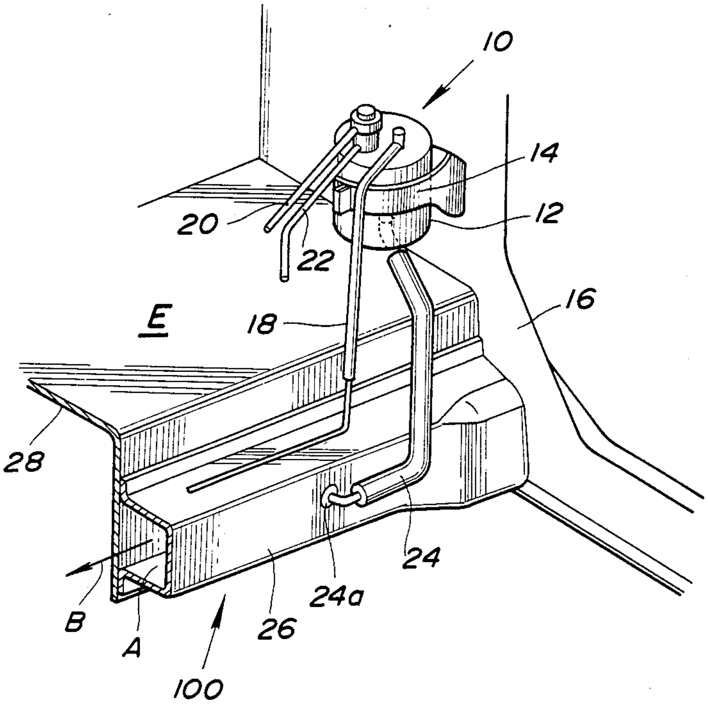
FIG. 15 (PRIOR ART)
FIG. 15 is a view similar to FIG. 1, but showing the afore-mentioned conventional vapor diffusing device.

Referring to FIGS. 13 and 14, there is shown a seventh embodiment 100G of the present invention. In this embodiment, a flanged cylinder member 60 is used, which is vertically arranged in the front side channel member 26 having the flanges thereof secured to the horizontally arranged upper and lower side walls 26c and 26b of the channel member 26. With this, an enclosed cylindrical chamber is defined in the cylinder member 60. An opening 32 is formed in the lower side wall 26b, which is exposed to the engine room. A depressed side edge portion 36a of the front under cover 36 is spaced from the opening 32 to form a splashboard. Another opening 42 is formed in the horizontally arranged upper side wall 26c of the channel member 26 at the position to be exposed to the cylindrical chamber. As is seen from FIG. 14, a connector 34 connected to the leading end of the drain hose 24 is fixed to the opening 42.

Although not described hereinabove, substantially the same advantageous function as that of the first embodiment 100A is equally achieved by the third, fourth, fifth, sixth and seventh embodiments 100C, 100D, 100E, 100F and 100G.

As will be understood from the foregoing description, in the present invention, the vapor diffusing opening 32 or 50 is positioned apart from the passenger room as compared with the conventional one, the ill-smell attack to the passengers is prevented or at least minimized. Furthermore, because of the vapor accumulating function of the enclosed chamber of the vapor diffusing device, the vapor led thereinto is discharged into the open air little by little, which weakens the ill-smell attack.

What is claimed is:

1. In a motor vehicle having in an engine room a vapor diffusing device connected to a carbon canister for adsorbing vapors from a fuel tank, said device including a front side channel member extending in said engine room from a front portion of the vehicle toward a passenger room of the same, said carbon canister having an evaporated gas tube connected to the fuel tank, a vacuum line connected to an intake manifold and a purge line connected to the intake manifold, and a first means extending from a purge air opening in the canister to the vapor diffusing device, the front side channel member functioning to vent fuel vapors in the canister to atmosphere, the improvement comprising a structure including wall means mounted to a part of said channel member to define an enclosed chamber with said part;

said first means fluidly connecting the interior of said enclosed chamber with the purge air opening of said carbon canister; and second means defining a vapor diffusing opening through which the interior of said enclosed chamber is exposed to the interior of the engine room, said vapor diffusing opening being positioned sufficiently apart from the passenger room so as to prevent vapor from the engine room from reaching the passenger room.

2. A motor vehicle as claimed in claim 1, wherein said channel member is assembled with a hood ridge panel to provide an elongate space which extends from said front portion toward said passenger room.

3. A motor vehicle as claimed in claim 2, wherein said structure is disposed on said front side channel member to define said enclosed chamber outside of said elongate space.

4. A motor vehicle as claimed in claim 3, wherein said structure is a depressed member which comprises a major portion disposed over one wall of said front side channel member and a minor portion disposed over another wall of the same.

5. A motor vehicle as claimed in claim 3, wherein said structure is a channel plate which is disposed on said front side channel member to cover a depressed portion formed on said channel member.

6. A motor vehicle as claimed in claim 3, wherein said structure is a depressed member which is disposed on said front side channel member to define therebetween said enclosed chamber.

7. A motor vehicle as claimed in claim 3, wherein said first means comprises:

a first opening formed in wall of said structure and exposed to said enclosed chamber;

a drain hose extending from said purge air opening of said carbon canister; and a connector connecting the leading end of side drain hose to said first opening.

8. A motor vehicle as claimed in claim 7, wherein said second means comprises a second opening formed in another wall of said structure, said second opening facing downward with respect to said engine room.

9. A motor vehicle as claimed in claim 8, wherein said structure has further a third opening which serves as a substitute for said first opening.

10. A motor vehicle as claimed in claim 2, wherein said structure is substantially entirely disposed in said elongate space to define the enclosed chamber in said elongate space.

11. A motor vehicle as claimed in claim 10, wherein said structure is a depressed member which comprises a curved back wall and two triangular side walls extending perpendicularly from opposed edges of said back wall, said depressed member being fixed in said front side channel member having flanges thereof secured to inside surfaces of said channel member.

12. A motor vehicle as claimed in claim 10, wherein said structure comprises a pair of partition members which are spacedly disposed in said elongate space to define therebetween said enclosed chamber.

13. A motor vehicle as claimed in claim 10, wherein said structure comprises an angular arch-shaped member, said arch-shaped member including a straight back wall and two rectangular side walls extending perpendicularly from opposed edges of said back wall, said arch-shaped member being fixed in said front side channel member having flanges thereof secured to inside surfaces of said channel member.

14. A motor vehicle as claimed in claim 10, wherein said structure comprises a cylinder member which is fixed in said front side channel member having its upper and lower flanges secured to inside surfaces of said channel member.

15. A motor vehicle as claimed in claim 10, wherein said first means comprises:

a first opening formed in a wall of said front side channel member and exposed to said enclosed chamber;

16. A motor vehicle as claimed in claim 15, wherein said second means comprises a second opening formed in another wall of said front side channel member, said second opening facing downward with respect to said engine room.

17. A motor vehicle as claimed in claim 16, wherein said front side channel member further has a third opening which serves as a substitute for said first opening.

18. A motor vehicle as claimed in claim 1, further comprising a splashboard which is secured to said front side channel member in a manner to spacedly cover said second opening.

19. A motor vehicle as claimed in claim 18, wherein said splashboard is a part of a front under cover, said front under cover extending in the engine room, from the front portion of the vehicle toward the passenger room.

* * * * *